No. 754,371. PATENTED MAR. 8, 1904.
M. HUTIN & M. LEBLANC.
ALTERNATING CURRENT TRANSFORMATION.
APPLICATION FILED APR. 3, 1895.
NO MODEL.
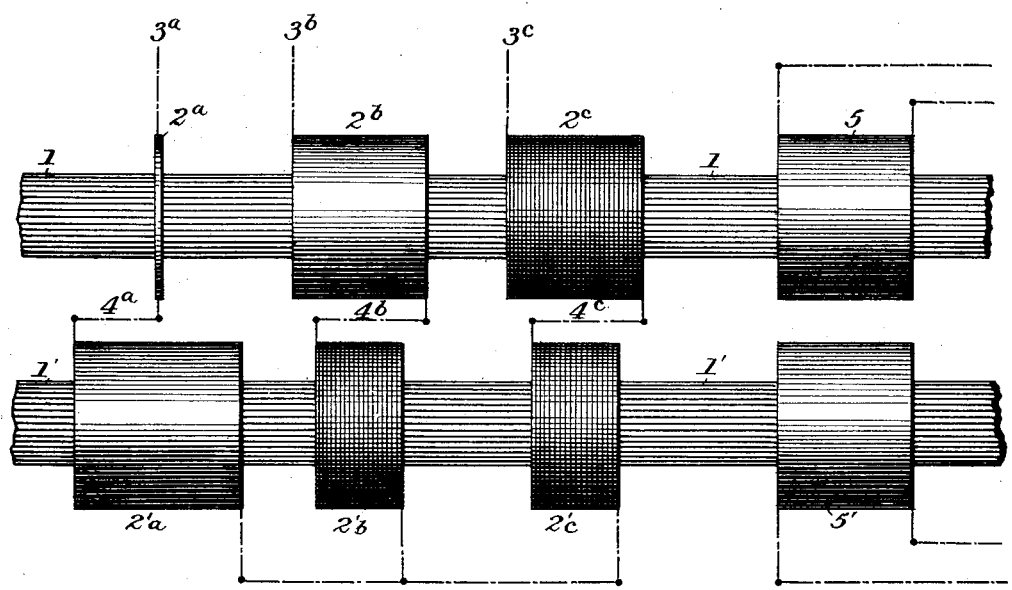
Witnesses
Jno. G. Hinkel
P. T. Chapman.
Inventors,
Maurice Hutin,
Maurice Leblanc,
By Joseph Lyons,
Attorney.

No. 754,371. Patented March 8, 1904.

UNITED STATES PATENT OFFICE.

MAURICE HUTIN AND MAURICE LEBLANC, OF PARIS, FRANCE, ASSIGNORS, BY MESNE ASSIGNMENTS, TO GEORGE WESTINGHOUSE, OF PITTSBURG, PENNSYLVANIA.

ALTERNATING-CURRENT TRANSFORMATION.

SPECIFICATION forming part of Letters Patent No. 754,371, dated March 8, 1904.

Application filed April 3, 1895. Serial No. 544,224. (No model.)

*To all whom it may concern:*

Be it known that we, MAURICE HUTIN and MAURICE LEBLANC, citizens of the Republic of France, and residents of Paris, in the Department of the Seine, in the Republic of France, have invented certain new and useful Improvements in Alternating-Current Transformation, (patented in France, No. 224,118, dated September 3, 1892, and in Great Britain, No. 17,826, dated October 6, 1892,) of which the following is a specification.

Our invention relates to the production of two separate alternating magnetic fluxes that are in quadrature and to the utilization of these fluxes for the generation of alternating currents.

It is within our invention to produce two separate alternating magnetic fluxes in quadrature in any way or manner and to produce by the conjoint inductive action of these fluxes three or more phase alternating currents, and it is also within our invention to produce two quarter-phase magnetic fluxes by three or more phase alternating currents, each acting inductively upon two magnetic cores in accordance with a sine and cosine law, respectively, and to produce by the separate inductive influence of the two fluxes thus generated two-phase alternating currents, and it is also within our invention to produce two-phase magnetic fluxes by two-phase alternating currents and to generate three or more phase alternating currents by the conjoint inductive action of the two fluxes upon windings that are graduated in accordance with a sine and cosine law.

An embodiment of our invention is illustrated in the accompanying drawing, which shows two inductional transformers wound and connected in accordance with our invention.

The drawing represents the case when either three-phase or two-phase currents are used for the production of two-phase magnetic fluxes; but the application of the principles of the invention to any number of dephased currents will be clear from the explanation of the use of the three-phase currents.

In the drawing, 1 and 1' represent the cores of two converters, which cores, it will be understood, are in practice closed upon themselves, generally ring-shaped, but which are here represented in part only and straightened out. Upon these cores are the coils $2_a$ $2_b$ $2_c$ and $2'_a$ $2'_b$ $2'_c$, which for the time being we will call the "primary" coils. They are of different sizes, as is represented by their different width, and on each core two of these three coils are wound in one direction and one coil wound in the opposite direction, as is represented by differences of shading. The coils $2_a$ and $2'_a$, $2_b$ and $2'_b$, $2_c$ and $2'_c$ are connected together, respectively, in series by conductors $4_a$, $4_b$, and $4_c$, while the free terminals of coils $2'_a$ $2'_b$ $2'_c$ are joined together. With the free terminals of coils $2_a$, $2_b$, and $2_c$ are connected the three line-wires $3_a$ $3_b$ $3_c$, respectively, conveying three-phase currents from any distant source of electromotive force. Supposing now that at any moment $t$ of the period T the currents supplied by the three wires are respectively $$I_a = A \sin. 2\pi \frac{t}{T},$$

$$I_b = A \sin. 2\pi \left(\frac{t}{T} + \frac{1}{3},\right)$$

$$I_c = A \sin. 2\pi \left(\frac{t}{T} + \frac{2}{3},\right)$$

wherein A designates the maximum intensity of the current and T the period of the same. Under these conditions the incoming current $I_a$ traverses the coils $2_a$ and $2'_a$, the incoming current $I_b$ traverses the coils $2_b$ and $2'_b$, and the incoming current $I_c$ traverses the coils $2_c$ and $2'_c$.

As before stated, the different coils of the two converters are not of equal size. They are graduated for each transformer, so that the numbers of their convolutions are related to each other either as the sines or as the cosines of the arcs representing the lags of the incoming currents from some arbitrarily-selected current, while the convolutions of the conjugated coils in the two transformers—namely, $2_a$ and $2'_a$, $2_b$ and $2'_b$, $2_c$ and $2'_c$—are related to each other as the sines and cosines of the same arcs. These lags of the incoming currents from some arbitrarily-selected or assumed current we shall hereinafter refer to simply as the "current lag." Following this rule and designating by $\gamma$ an arbitrarily-chosen constant number of turns of coil-winding and by $\alpha$ any arbitrary constant quantity, we make the number of convolutions for coil $2_a$, $\gamma \sin. 2 \pi \alpha$;

for coil $2'_a$, $\gamma \cos. 2 \pi \alpha$;

for coil $2_b$, $\gamma \sin. 2 \pi (\alpha + \frac{1}{3};)$ for coil $2'_b$, $\gamma \cos. 2 \pi (\alpha + \frac{1}{3};)$ for coil $2_c$, $\gamma \sin. 2 \pi (\alpha + \frac{2}{3};)$ for coil $2'_c$, $\gamma \cos. 2 \pi (\alpha + \frac{2}{3}.)$ The number of alternating ampere-turns developed about the core 1 will therefore be $$\gamma A [\sin. 2 \pi \frac{t}{T} \sin. 2 \pi \alpha + \sin. 2 \pi \left(\frac{t}{T} + \frac{1}{3}\right) \sin. 2 \pi (\alpha + \frac{1}{3}) + \sin. 2 \pi \left(\frac{t}{T} + \frac{2}{3}\right) \sin. 2 \pi (\alpha + \frac{2}{3},)]$$

which expression may be reduced to $$\frac{2}{3} \gamma A \cos. 2 \pi \left(\frac{t}{T} - \alpha.\right)$$

Similarly the number of alternating ampere-turns developed about the core $1'$ will be $$\frac{2}{3} \gamma A \sin. 2 \pi \left(\frac{t}{T} - \alpha.\right)$$

The meaning of these last two expressions is that in each core the same number of ampere-turns will be developed; but the phases of the same will be shifted with reference to each other by one quadrant. The effect of this is, as is readily understood, that the magnetic fluxes in the two transformer-cores will also be equal, but will be dephased by reference to each other by one quadrant. From this it follows immediately that the currents induced in any secondary coils 5 5' of the two transformers will also be dephased with reference to each other by one-quarter of a period.

It will now be evident to those skilled in the art that if our general rule of winding and connecting the coils of two transformers is followed we are enabled to produce by any number of dephased alternating currents two independent alternating magnetic fluxes, which are dephased with reference to each other by a quarter of a period. Thus, for instance, if we use J currents they must be dephased with reference to each other by $\frac{1}{J}$ of a period. These currents will therefore be $$I_a = A \sin. 2 \pi \frac{t}{T};$$

$$I_b = A \sin. 2 \pi \left(\frac{t}{T} + \frac{1}{J};\right)$$

$$I_c = A \sin. 2 \pi \left(\frac{t}{T} + \frac{2}{J};\right)$$

. . . . . . . . . . . . . . . . . . . . . . . . . . . . . . . . . .

$$I_{J-1} = A \sin. 2 \pi \left(\frac{t}{T} + \frac{J-2}{J};\right)$$

$$I_J = A \sin. 2 \pi \left(\frac{t}{T} + \frac{J-1}{J}.\right)$$

The number of windings of the primary coils on core 1 will then be in accordance with the principle of our invention— for coil $2_a$, $\gamma \sin. 2 \pi \alpha$;

for coil $2_b$, $\gamma \sin. 2 \pi (\alpha + \frac{1}{J};)$ for coil $2_c$, $\gamma \sin. 2 \pi (\alpha + \frac{2}{J};)$

. . . . . . . . . . . . . . . . . . . . . . . . . . . . . . . . . .

for coil $2_{J-2}$, $\gamma \sin. 2 \pi (\alpha + \frac{J-2}{J},)$ and for coil $2_{J-1}$, $\gamma \sin. 2 \pi (\alpha + \frac{J-1}{J},)$ and similarly for coil $2'_a$, $\gamma \cos. 2 \pi \alpha$;

for coil $2'_b$, $\gamma \cos. 2 \pi (\alpha + \frac{1}{J};)$ for coil $2'_c$, $\gamma \cos. 2 \pi (\alpha + \frac{2}{J};)$

. . . . . . . . . . . . . . . . . . . . . . . . . . . . . . . . . .

for coil $2'_{J-2}$, $\gamma \cos. 2 \pi (\alpha + \frac{J-2}{J},)$ and for coil $2'_{J-1}$, $\gamma \cos. 2 \pi (\alpha + \frac{J-1}{J}.)$ The ampere-turns developed about the core 1 will then be $\frac{J-1}{J} \gamma A \cos. 2 \pi, \left(\frac{t}{T} - \alpha,\right)$ and similarly the ampere-turns developed about the core $1'$ will be $\frac{J-1}{J} \gamma A \sin. 2 \pi \left(\frac{t}{T} - \alpha.\right)$ The corresponding alternating magnetic fluxes produced in the two cores will therefore be dephased by one-quarter of a period, and so will the alternating currents thereby induced in any secondary coils 5 5' upon the same cores. The result of our method of procedure is therefore precisely the same as if each transformer had only a single primary coil upon its core and as if each coil were traversed by a separate alternating current which is in quadrature with the other current. We are thus enabled to accomplish by the use of polyphase currents that which heretofore could only be accomplished by two-phase currents—namely, the production of two-phase magnetic fluxes. Moreover, the system is obviously reversible—that is to say, by two-phase alternating magnetic fluxes, however produced, multiphase currents can be generated—which ordinarily means the conversion of two-phase currents of any tension into three or more phase currents of the same or any other tension. In that case the coils 5 5' may be the primary coils and the coils $2_a \, 2_b$, &c., become the secondary coils.

It is quite obvious that for the purposes of our invention the coils of the two transformers may be arranged upon their cores in any suitable manner and that we are not limited to any particular shape or to any details of construction so long as the fundamental principles herein set forth are observed.

Having now fully described our invention, we claim and desire to secure by Letters Patent—

1. The method of generating electrical energy, which consists in producing two separate alternating magnetic fluxes in quadrature, and generating by the inductive influence of these fluxes three or more alternating working currents, dephased with reference to each other, substantially as described.

2. The method of producing two separate alternating magnetic fluxes in quadrature, by a greater number of dephased alternating currents, which consists in passing each of the initial currents around one of two separate magnetic cores in a number of turns proportionate to the sine of the current lag and around the other core in a number of turns proportionate to the cosine of the same current lag, substantially as described.

3. The method of generating three or more dephased alternating electric currents by two separate magnetic fluxes which are in quadrature, by subjecting three or more circuits simultaneously to the inductive action of the two fluxes, each circuit in the ratio of the sine of its current lag by one flux and in the ratio of the cosine of its current lag by the other flux, substantially as described.

4. The method of transforming electrical energy, which consists in generating by the combined inductive influence of three or more phase alternating currents two separate alternating magnetic fluxes in quadrature, substantially as described.

5. The method of transforming two-phase alternating currents into three-phase alternating currents, which consists in producing two separate alternating magnetic fluxes in quadrature by the inductive influence of the two-phase currents, and subjecting three circuits simultaneously to the inductive action of the two fluxes, each circuit in the ratio of the sine of the desired current lag by one flux, and in the ratio of the cosine of the desired current lag by the other flux, substantially as described.

6. The method of transforming three-phase alternating currents into two-phase alternating currents, which consists in passing each of the three-phase currents around one of two separate magnetic cores in a number of turns proportionate to the sine of the current lag and around the other core in a number of turns proportionate to the cosine of the same current lag, whereby two separate alternating magnetic fluxes in quadrature are produced, and generating by these two fluxes two-phase alternating currents, substantially as described.

In testimony whereof we have signed our names to this specification in the presence of two subscribing witnesses.

MAURICE HUTIN.
MAURICE LEBLANC.

Witnesses:
T. BONY,
MONTAGUE.